W. SCHOENHAAR.
BAKER'S OVEN.
APPLICATION FILED MAR. 19, 1909.

940,559.

Patented Nov. 16, 1909.

4 SHEETS—SHEET 1.

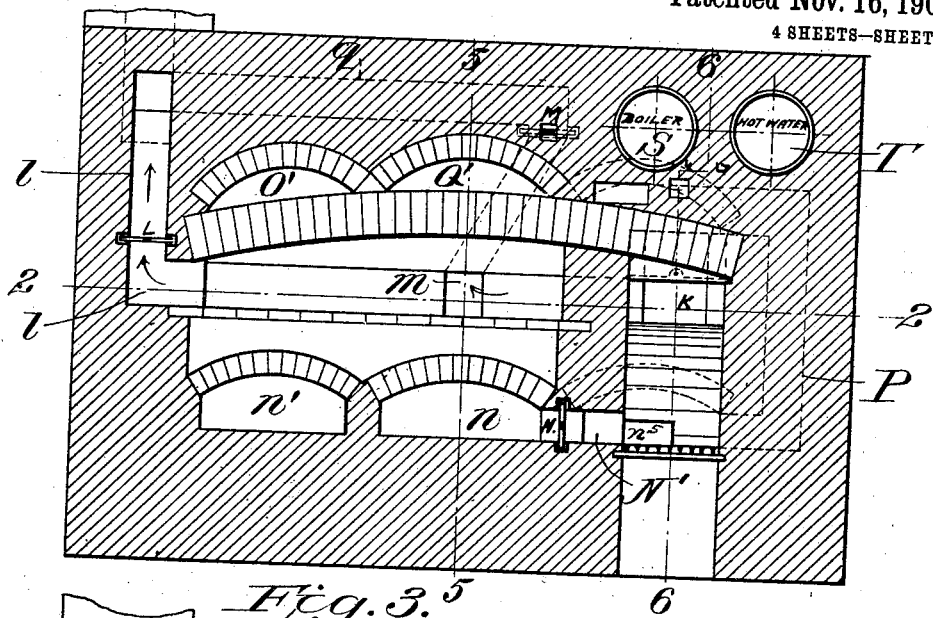
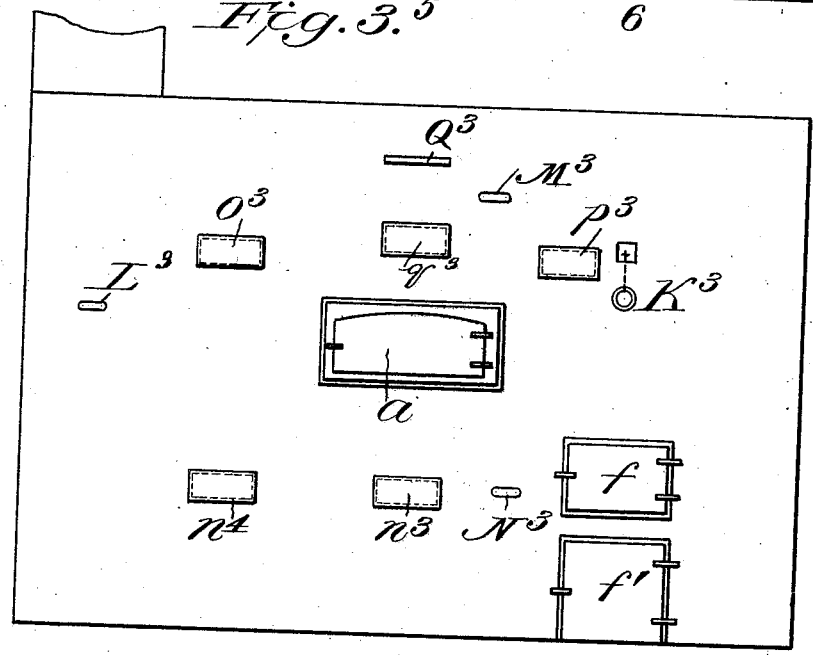

UNITED STATES PATENT OFFICE.

WILLIAM SCHOENHAAR, OF WILMINGTON, DELAWARE.

BAKER'S OVEN.

940,559.  Specification of Letters Patent.  Patented Nov. 16, 1909.

Application filed March 19, 1909. Serial No. 484,516.

*To all whom it may concern:*

Be it known that I, WILLIAM SCHOENHAAR, of Wilmington, in the county of Newcastle and State of Delaware, have invented certain new and useful Improvements in Bakers' Ovens; and I hereby declare that the following is a full, clear, and exact description thereof, reference being had to the accompanying drawings, which form part of this specification.

This invention is an improvement in bakers' ovens and its object is to make an oven of simple construction and economical of fuel, and in which the baking chamber can be heated either by direct or indirect firing, so that the oven can be used to best advantage according to the kind of food being cooked, and as desired by the operator. "Direct firing" is preferable for baking all kinds of pastry and foods requiring a quick intense heat, and for such purpose the products of combustion are led direct from the fire chamber through the baking chamber to the chimney. "Indirect firing" is preferable for baking other foods requiring lower and longer heat, and is accomplished by diverting the products of combustion from the baking chamber into flues exterior to the baking chamber, so that the products of combustion are circulated around the baking chamber and heat the latter indirectly before they escape to the uptake.

The present invention consists in the novel construction of the oven, including the arrangement of the fire chamber, baking chamber, flues and passages therein, as will be hereinafter fully explained with reference to the accompanying drawings which form part of this specification and which illustrate a practical oven embodying the invention.

Figure 1:
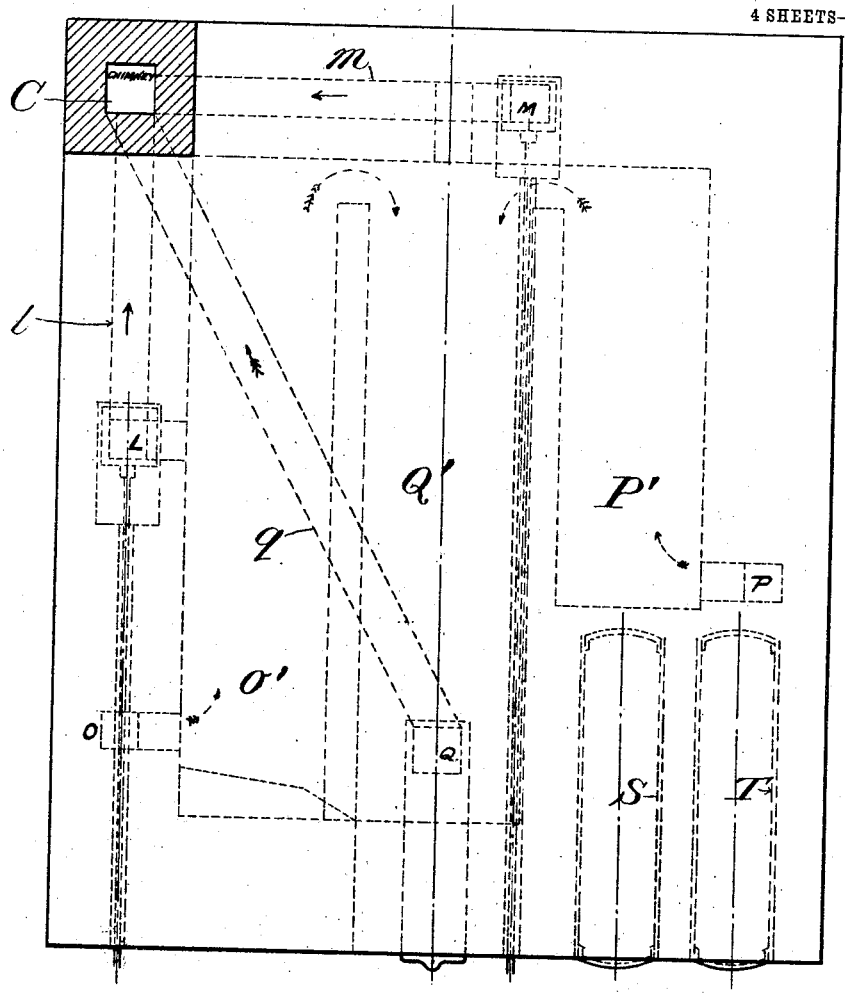
Figure 2:
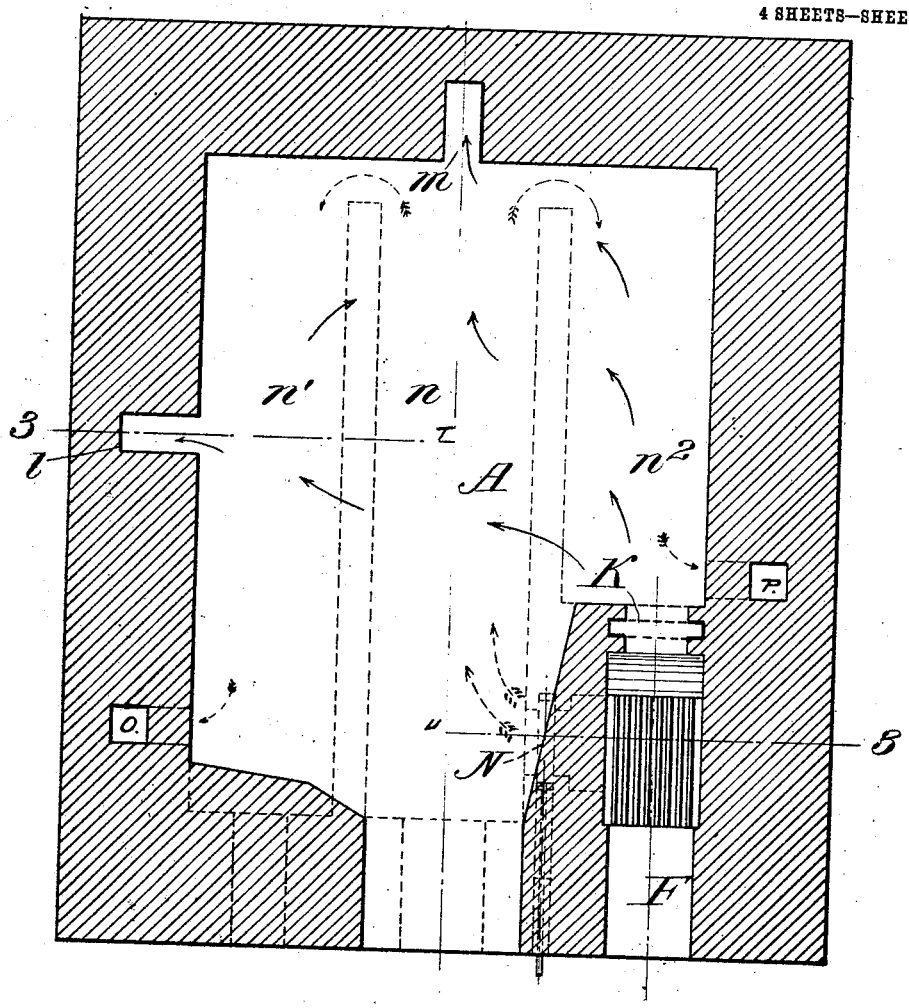
Figure 5:
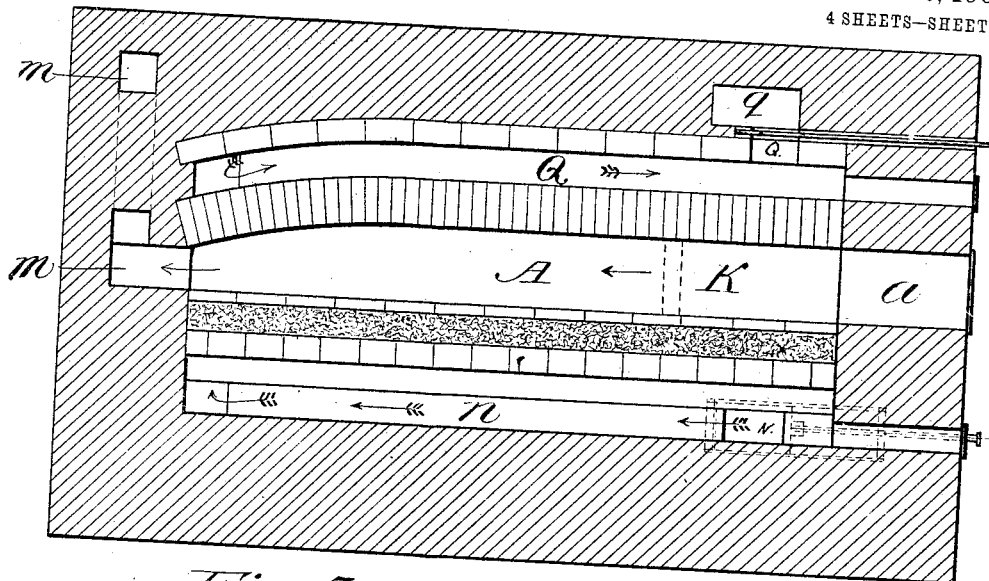
Figure 6:
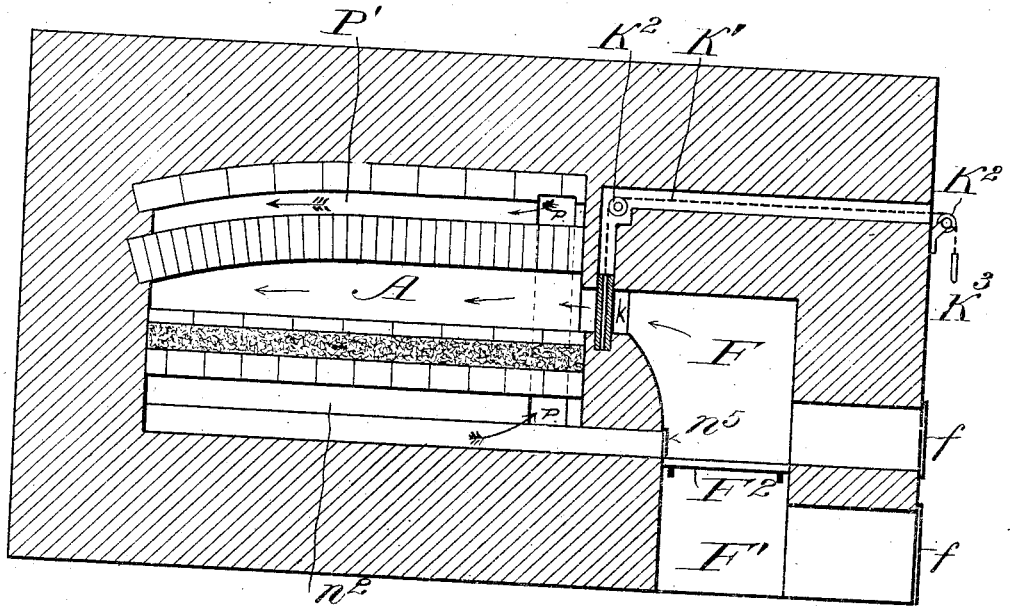

In said drawings—Figure 1 is a top plan view of the oven indicating in dotted lines the arrangement of the heating flues and passages above the baking chamber. Fig. 2 is a horizontal section on line 2—2, Fig. 3, indicating in dotted lines the arrangement of the heating flues below the baking chamber. Fig. 3 is a vertical transverse section on the lines 3—3, Fig. 2. Fig. 4 is a front end elevation of the oven. Fig. 5 is a longitudinal vertical section on line 5—5, Fig. 3. Fig. 6 is a longitudinal vertical section on line 6—6, Fig. 3.

The oven has a central baking chamber A; and a fire chamber F having a grate $F^2$ and ash pit $F'$ below the grate; access can be had to the fire chamber through a door $f$ and to the ash pit through a door $f'$. The fire chamber is preferably arranged at one front corner of the oven and is adapted to discharge the products of combustion directly into the chamber A through a passage $k$ at the inner end of the fire chamber, said passage $k$ being closable by a damper K which may be operated by means of a cord or chain K' running over suitable pulleys $K^2$ and through a passage in the wall of the oven to the front end thereof, where it is connected to a ring or pull $K^3$ by which the damper K can be raised or lowered so as to open or close passage $k$.

When the damper K is opened, as indicated in Fig. 2, the products of combustion pass from the fire chamber into the baking chamber A; and after circulating therein they pass out through flues $l$, $m$, in the side and end walls of the furnace, and escape through said flues to an uptake C at the corner of the furnace, farthest removed from the fire chamber F. Thus the products of combustion are caused to practically circulate entirely through the baking chamber and highly heat the same. If it is not desired to heat the baking chamber by direct firing, damper K is closed. The fire chamber F also communicates through a side passage N', see Fig. 3, with a central flue $n$ beneath the floor of the baking chamber A; the passage N' may be closed by a damper N. The flue $n$ extends longitudinally of the oven and on opposite sides thereof are the parallel flues $n'$, $n^2$; and when damper N is opened the products of combustion after flowing back through flue $n$ divide and pass into flues $n'$, $n^2$, as indicated by the tailed arrows shown in dotted lines in Fig. 2 of the drawings, and the products after traversing flue $n$ divide and enter flues $n'$, $n^2$ and return forwardly through flues $n'$, $n^2$ and then pass up through passages O and P into flues O', P' above the baking chamber A, see Fig. 1. The flues O', P', are separated by an intermediate flue Q' into which both flues O', P' discharge at the rear end of the oven, see dotted tailed arrows in Fig. 1, and the reunited products then pass forwardly in flue Q' and escape from the latter through passage $q$ to the chimney C, see Figs. 1 and 5. The passage $q$ may be provided with a damper Q.

In the drawings the tailless arrows indicate the passage of the products of combustion through the baking chamber during the "direct firing" of the oven, and the tailed arrows indicate the passage of the products of combustion through the flues during "indirect firing" of the oven.

In Fig. 4 $o^3$, $q^3$, $p^3$, $n^4$, $n^3$, indicate cleanout doors for the respective flues O', Q', P', N', n; flue $N^2$ may be cleaned out through an opening at the back of the fire chamber closed by a door $n^5$, see Fig. 6. The dampers M, L, N, may be operated by pull rods $M^3$, $L^3$, $N^3$, as indicated in the drawings. Access is had to the baking oven through a usual opening closed by a door a.

When the damper N is closed and the dampers K, L, M, opened the products of combustion pass from the fire chamber F directly into the baking chamber A, and thence through passages l, m, to the uptake C, heating the oven quickly and directly by the products of combustion circulating therethrough. If the dampers L, K, M, are closed and dampers N, Q, opened, the products of combustion will circulate from the fire chamber successively through flues n, and n', $n^2$, passages O, P, and flues O', P', to flue Q', and thence through passage q to the chimney; the products thus circulate both above and below the baking chamber and practically envelop the same and heat the walls thereof very highly without subjecting the articles in the baking oven to direct action of the products, and in this way the oven may be continually fired and the baking chamber maintained at any desired temperature during the baking operations.

Above the fire chamber at a point where it is subjected to great heat a boiler S and a hot water container T may be conveniently arranged, as indicated in the drawings.

Having described my invention, what I claim as new and desire to secure by Letters Patent thereon is:

1. A baking oven, a baking chamber, a chimney at one end thereof, a fire chamber at the opposite end thereof, side and end passages connecting the baking chamber with the chimney, dampers for closing said passages, a passage connecting the fire chamber with the baking chamber, a damper for closing said passage, flues below the baking chamber, a side passage connecting the fire chamber with said flues, a damper for closing said passage, similar flues above the baking chamber, passages in the side walls of the furnace connecting the lower flues with the upper flues, a passage leading from the upper flues to the chimney, and a damper for closing said passage.

2. A baking oven comprising a baking chamber, a chimney at one corner thereof, a fire chamber at the corner farthest removed from the chimney, side and end passages connecting the baking chamber with the chimney, dampers for closing said passages, a passage connecting the fire chamber with the baking chamber, a damper for closing said passage, flues below the baking chamber, a passage in the side of the fire chamber communicating with the said flues, a damper for closing said passage, flues above the baking chamber, passages in the sides of the furnace connecting the lower flues with the upper flues, a passage leading from the discharge end of the upper central flue to the chimney, and a damper for closing said passage.

3. A baking oven comprising a baking chamber, a chimney at one end thereof, a fire chamber at the opposite corner thereof, side and end passages connecting the baking chamber with the chimney, dampers for closing said passages, a passage connecting the fire chamber with the baking chamber, a damper for closing said passage, a central and two side flues below the baking chamber, a passage connecting the fire chamber with the said central flue, a damper for closing said passage, three similar flues above the baking chamber, passages in the sides of the furnace connecting the lower side flues with the upper side flues, a passage leading from the discharge end of the upper central flue to the chimney, and a damper for closing said passage.

In testimony that I claim the foregoing as my own, I affix my signature in presence of two witnesses.

WILLIAM SCHOENHAAR.

Witnesses:
LAWRENCE J. BRAMAN,
JOHN F. LYNN.